Feb. 26, 1924.
G. A. LYON
1,485,042
AUTOMOBILE BUFFER ATTACHING DEVICE
Filed Oct. 25, 1922
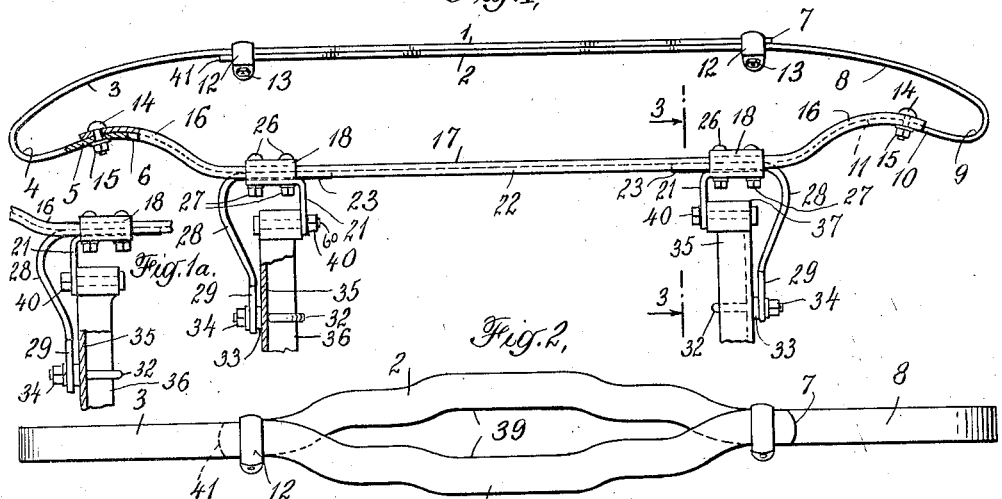
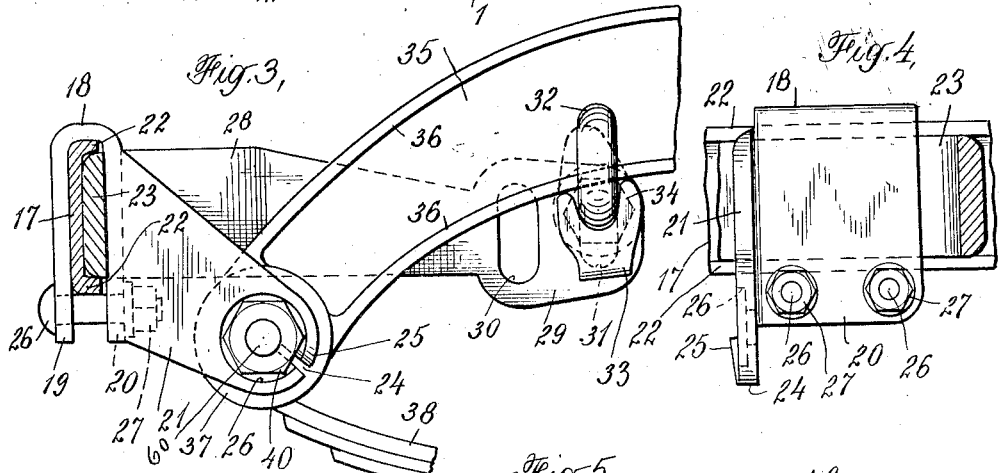
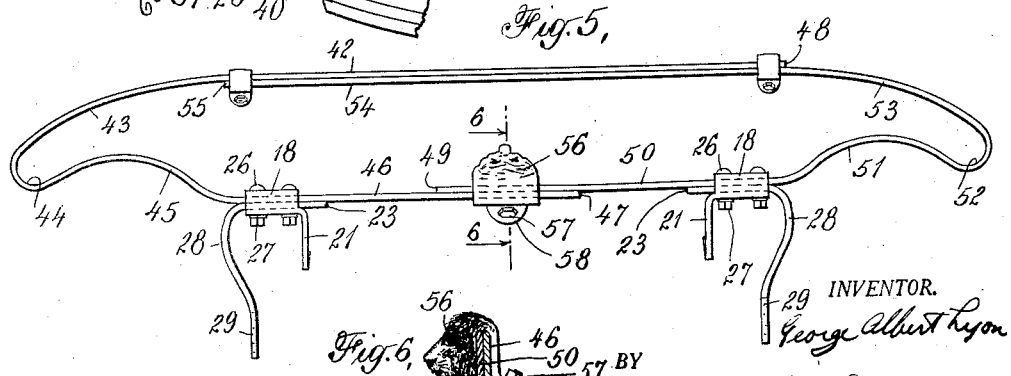
INVENTOR.
George Albert Lyon
BY
Harry L. Duncan
ATTORNEY.

Patented Feb. 26, 1924.

1,485,042

UNITED STATES PATENT OFFICE.

GEORGE ALBERT LYON, OF PHILADELPHIA, PENNSYLVANIA.

AUTOMOBILE BUFFER-ATTACHING DEVICE.

Application filed October 25, 1922. Serial No. 596,885.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffer-Attaching Devices, of which the following is a specification, taken in connection with the accompanying drawing.

This invention relates especially to automobile buffers and attaching devices therefor which comprise brackets to which a rear transverse member or portion of the buffer is clamped so as to secure the same to the automobile frame members. Each bracket preferably comprises a pair of sheet steel or strip members, each having a rearwardly extending arm to be secured to the automobile frame, one of these members having an integral enclosing clamping device preferably formed on the short bracket arm which is clamped to the automobile spring bolt. By making these bracket members of steel strip or stamped up plate a quarter of an inch thick more or less, one or both of the bracket members may be hardened and tempered so as to secure additional stiffness and strength and in this way the resilient spring steel may be used to form a desirable nut lock portion such as a resilient upwardly projecting portion or member on the short bracket arm to engage and lock the nut on the spring bolt against working loose. It is also desirable to form this bracket arm with a tight fitting securing socket of such diameter as to engage the usual nut on the spring bolt so that a definite engagement is secured between the outside of this nut and the socket and a correspondingly more rigid connection secured for the bracket.

In the accompanying drawing showing in a somewhat diagrammatic way various illustrative embodiments of this invention:

Fig. 1 is a plan view partly in section, showing one form of buffer and supporting brackets.

Fig. 1ª is a detailed top view showing another arrangement of the bracket.

Fig. 2 is a front view of the buffer.

Fig. 3 is an enlarged side view of the bracket and its connections with the frame member, taken along the line 3—3 of Fig. 1.

Fig. 4 is a rear sectional view of the bracket.

Fig. 5 is a plan view showing another form of buffer, and

Fig. 6 is a transverse section taken along the line 6—6 of Fig. 5.

These supporting brackets may be used with any suitable form of buffer for automobiles or other vehicles in which one or more rear transverse members are formed to which the brackets may be clamped and in Figs. 1 and 2 a desirable form of buffer is illustrated as comprising front reenforcing members or tempered spring steel strips 1 and 2 which may, if desired, be vertically bent or displaced as shown in Fig. 2 so as to form a central opening 39 between them and thus provide a vertically wide double strip buffer front resiliently connected to the end loop portions connected with the strips 3, 8. These front strips or members may be securely clamped or connected together adjacent the ends 7, 41 of the strips as by the enclosing clamping members 12 which may be tightly clamped around these strips by tightening the nuts or bolts 13. In this form of buffer the strips are carried inward beyond the end loops 4, 9 to form the inturned connector portions 5, 10 which may cooperate with one or more transverse or supporting members of the buffer such as the spring channel supporting member or brace bar 17 which has the forwardly and outwardly bent connecting portions 16 curved so as to engage the inturned connector portions of the front members which preferably fit quite tight within the channel section of this transverse member so as to be aligned by the flanges 22 thereof, these parts being securely clamped or connected as by one or more bolts 14 and nuts 15 passing through each of these cooperating connector portions on each side of the buffer adjacent the ends 6, 11 of the inturned front strips.

The securing brackets are preferably formed of steel strip or plate and each bracket advantageously has a short, rearwardly and downwardly extending bracket arm 21 adapted to be connected to the spring bolt 60 of the automobile frame member while the forward portion of this short bracket arm is preferably bent laterally to form a clamp body 20 as is shown in Figs. 1 and 4. This clamp may have aligning or enclosing portions to engage and securely hold the cooperating buffer or bracket members, one of which may be advantageously formed of channelled or flanged cross section for greater aligning action, and one or more forwardly projecting flanges or portions on the clamp are desirable for this purpose, such as the forwardly bent clamp top 18 which may be integral with the downwardly extending clamp front 19 all of which may be bent or forged out of a single plate of spring steel or other suitable material which, if desired, may be hardened and tempered at least throughout the parts of the same in which the greatest strength and resilience are desired. As is seen in Fig. 3, this short bracket arm 21 is intended to be bolted to the spring bolt 60 extending through the frame end 37 and securing the spring 38 to the front end of the usual channelled frame member of the automobile. For this purpose it is desirable in many cases to form a socket in the end of this bracket arm and the securing socket 26 may be formed for this purpose of such diameter as to engage and grippingly hold, if desired, the usual nut 40 used on this spring bolt which when screwed on the bolt 60 after the bracket end has been put in place thus strongly engages this securing socket and adds considerably to the strength of the connection. It is also desirable to provide this bracket arm either instead of or in addition to such a socket with a resilient nut lock portion which may be conveniently formed by stamping or otherwise forming a slot 24 in this bracket arm and bending or forcing upward the adjacent projecting portion 25 of the bracket so that it resiliently engages the nut and holds it against rearward movement in the same general way as a lock washer. This bracket arm and clamp may be provided with any suitable clamping bolts or members such as one or more bolts 26 which may pass through the lower edges or portions of the clamp front and body so as to forcibly close the same together upon the interposed buffer or bracket members and, if desired, these bolts may of course be so positioned as to engage the lower edges of these members and promote their vertical alignment in this way.

Each of the brackets is preferably formed with a long bracket arm of steel strip or plate which may have, if desired, a bent lateral portion 28 and a substantially straight securing portion 29 which, as shown in Fig. 1, is preferably substantially parallel to the short bracket arm 21 and the adjacent web 35 of the frame member. These long bracket arms are also preferably formed with a laterally bent clamping or connecting end or portion 23 adapted to cooperate with the clamp formed on the other bracket arm to be thereby clamped to the cooperating buffer member. As shown in Figs. 1 and 3, these transversely or horizontally extending connecting portions 23 of the long bracket arms are preferably of such size as to extend within the spring channel transverse member 17 of the buffer and be more or less aligned by the rearwardly extending flanges 22 thereon, all of these parts being securely clamped within the two bracket clamps when the nuts 27 are tightened up on the bolts 26 so as to bring these clamp portions together on opposite sides of the interposed members. As shown in Fig. 1, the spring bolts usually have their nuts 40 on the inside of the frame ends and when the short bracket arms are bolted in position on the ends of these spring bolts the bracket clamp may extend outward transversly from these short bracket arms so as to be practically in front of the frame ends, the cooperating long bracket arms 28 which are preferably clamped or bolted on the outside of these channel frame members having the horizontal connecting or clamping portions 23 thereof extending inward into the clamps on the other bracket arms as illustrated. If, however, the nuts happen to be arranged on the outside faces of the frame ends as indicated in Fig. 1ᵃ, the short bracket arms may be reversed in position as compared to the arrangement shown in Fig. 1 so that the right hand bracket arm and clamp is bolted on the outside of the left-hand frame end, as shown in Fig. 1ᵃ; the long bracket arm 28 being clamped or connected to the outer face of the frame member and having the front end or connector portion 23 extending inward through the clamp so as to secure in this position also a firm and reliable connection between the parts.

It is desirable to form the securing end or portion 29 of these long bracket arms with one or more securing slots or apertures such as 30, 31 which may be vertical or inclined and which preferably extend from about the center line of the bracket arm and connected bracket clamp to somewhat different heights at various points along the bracket arm so that a considerable range of adjustment is thus secured in the point at which a bolt through the frame web or the shank of the hook bolt 32 is secured to the bracket arm. This range of adjustment may also be considerably extended when desired, by turning these long bracket arms upside down and changing them from the left to right sides of the buffer which brings the securing apertures above the center line instead of below as indicated in Fig. 3. As illustrated in Figs. 1 and 3, the hook bolt 32 may extend around the lower flange 36 of the frame member, while the usual hook bolt spacer 33 is put in place so that it is interposed between the web 35 of the frame member and the bracket arm 29; all these parts being securely connected when the nut 34 is screwed up on the stem of the hook bolt. By having this hook bolt located four to six inches more or less back along the frame member from the spring bolt 60 to which the other bracket arm is secured a considerable leverage is secured to resist vertical strains on the bracket which are caused by the bumper during running or collision conditions. For this reason it is usually desirable to have the short arm of the bracket to which the clamp is preferably connected relatively short as compared to the long bracket arm which may have sufficient range of adjustment in its securing slots or apertures so that these two cooperating bracket members give a very wide range of adjustment and can be used with a correspondingly large number of the usual types or makes of automobiles. It is also desirable to have the rear transverse member of the spring buffer continuous and relatively rigid between the two brackets which minimizes twisting strains on the brackets and makes the connection to the automobile more strong and secure.

Fig. 5 shows another form of Lyon type buffer which may be used with this type of bracket. Two generally U-shaped spring steel strips or elements form the buffer in this instance and one of these strips comprises the front or impact receiving member 42 which may be bent backward at 43 adjacent the end loop 44. The inturned rearwardly extending portion 45 of this element may lead into the rear transverse portion 46 which may more or less overlap the cooperating rear transverse portion 50 of the other element. This other cooperating element may have a bent portion 51 and end loop 52 connected to its front curved portion 53, 54 which may overlap or reenforce the front portion 42 of the other member and be connected thereto by the clamping members indicated adjacent the ends 48, 55 of these strips. One or more clamping members may be used to connect the rear transverse members of this buffer between their ends 47, 49 and in some cases an ornamental clamping member 56 may be used for this purpose and be clamped around these strips by the bolt 57 passing through the ends or inclined rear portions 58 of the clamp which may have, if desired, an ornamental configuration. In such a case the bracket clamps indicated are preferably formed with such a vertical opening as to fit fairly closely around the buffer strips or elements passing through them so as to promote the alignment of these strips in addition to the clamping action of these clamps.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims.

I claim—

1. The automobile buffer attaching device consisting of a pair of brackets each comprising a short substantially straight spring steel bracket arm having a lateral bend connecting it to an integral steel bracket clamp adapted to substantially enclose and secure cooperating buffer members, the rearwardly extending end of said short bracket arm having a bolt hole for the spring bolt, and a cooperating long bracket arm of spring steel comprising a transversely extending connecting portion extending through said bracket clamp and comprising a rearwardly extending securing portion adapted to be bolted to a frame member in substantially parallel position to said short bracket arm and a buffer comprising a channel section rear transverse member adapted to extend through said bracket clamps and align the cooperating connecting portions of said long bracket arms.

2. The automobile buffer attaching device consisting of a pair of brackets each comprising a short steel bracket arm having a lateral bend connecting it to an integral steel bracket clamp adapted to substantially enclose and secure cooperating buffer members, the rearwardly extending end of said short bracket arm having a bolt hole for the spring bolt, and a cooperating long bracket arm of spring steel comprising a transversely extending connecting portion extending through said bracket clamp and comprising a rearwardly extending securing portion adapted to be bolted to a frame member and a buffer comprising a rear transverse member adapted to extend through said bracket clamps.

3. The automobile buffer attaching device consisting of a pair of brackets each comprising a reversible short sheet steel bracket arm adapted to be connected to a spring bolt and having an integral spring steel bracket clamp adapted to be secured to cooperating buffer members, and a cooperating long bracket arm of strip steel comprising a transversely extending connecting portion cooperating with said bracket clamp and comprising a rearwardly extending securing portion adapted to be secured to a frame member, and a buffer comprising channel section rear transverse connecting portions adapted to cooperate with said bracket clamps and align the cooperating connecting portions of said long bracket arms.

4. The automobile buffer attaching device consisting of a pair of brackets each comprising a reversible short steel bracket arm adapted to be connected to a spring bolt and having an integral bracket clamp adapted to be secured to cooperating buffer members, and a cooperating long bracket arm comprising a transversely extending connecting portion cooperating with said bracket clamp and comprising a rearwardly extending securing portion adapted to be secured to a frame member, and a buffer comprising flanged section rear transverse connecting portions adapted to cooperate with said bracket clamps and align the cooperating connecting portions of said long bracket arms.

5. The automobile buffer attaching bracket comprising a spring steel enclosing bracket clamp adapted to be clamped around buffer elements and having a rearwardly bent integral portion extending from the clamp body and forming a short bracket arm having a spring bolt hole and socket and adapted to be clamped to the spring bolt of an automobile frame member, and a cooperating long bracket arm of spring steel having a plurality of securing slots formed at different heights in its rear securing portion and adapted to be bolted to the outer face of a frame member and having a forward laterally bent connecting portion adapted to extend through said clamp and be secured to a cooperating buffer member extending therein.

6. The automobile buffer attaching bracket comprising a spring steel bracket clamp adapted to be clamped around buffer elements and having a rearwardly bent integral portion extending from the clamp body and forming a short bracket arm having a spring bolt hole and adapted to be clamped to the spring bolt of an automobile frame member, and a cooperating long bracket arm of spring steel adapted to be bolted to the outer face of a frame member and having a forward laterally bent connecting portion adapted to extend through said clamp and be secured to a cooperating buffer member extending therein.

7. The automobile buffer attaching bracket comprising a reversible sheet steel bracket clamp adapted to be clamped to buffer elements and having a rearwardly bent flat short bracket arm extending from the clamp body and having a spring bolt hole and adapted to be clamped to the spring bolt of an automobile frame member, and a cooperating long bracket arm having a securing slot formed in its rear securing portion and adapted to be bolted to the outer face of a frame member and having a forward laterally bent connecting portion adapted to cooperate with and be aligned by said clamp and be secured to a cooperating buffer member.

8. The automobile buffer attaching bracket comprising a sheet steel bracket clamp adapted to extend around and be clamped to buffer elements and having a rearwardly bent short bracket arm extending from the clamp body and having a spring bolt hole and adapted to be clamped to the spring bolt of an automobile frame member, and a cooperating long bracket arm having a securing aperture formed in its rear securing portion and adapted to be bolted to the outer face of a frame member and having a forward laterally bent connecting portion adapted to cooperate with said clamp and be secured to a cooperating buffer member.

9. The automobile buffer attaching bracket comprising a spring sheet steel bracket clamp adapted to be clamped around buffer elements and having an integral substantially flat rearwardly bent portion extending from the clamp body and forming a short bracket arm having a spring bolt hole and concentric socket and adapted to be clamped to the spring bolt of an automobile frame member.

10. The automobile buffer attaching bracket comprising a sheet steel bracket clamp adapted to be clamped around buffer elements and having an integral rearwardly bent portion extending from the clamp body and forming a bracket arm having a spring bolt hole and adapted to be clamped to the spring bolt of an automobile frame member.

11. The automobile buffer attaching bracket comprising a one-piece steel enclosing bracket clamp adapted to be clamped around buffer elements and having a clamp body and a rearwardly bent substantially flat bracket arm portion having a spring bolt aperture and adapted to be clamped to the spring bolt of an automobile frame member.

12. The automobile buffer attaching bracket comprising a one-piece sheet steel bracket clamp adapted to extend around and be clamped to buffer elements and having a clamp body and a rearwardly bent bracket arm portion adapted to be clamped to the spring bolt of an automobile frame member.

GEORGE ALBERT LYON.